United States Patent [19]

Solzer

[11] Patent Number: 4,861,479

[45] Date of Patent: Aug. 29, 1989

[54] TUBULAR FILTER ELEMENT WITH BIASING ELEMENT AND METHOD OF MAKING

[75] Inventor: Willi Solzer, Flörsbachtal/Mosborn, Fed. Rep. of Germany

[73] Assignee: Faudi Feinbau GmbH, Oberursel, Fed. Rep. of Germany

[21] Appl. No.: 249,331

[22] Filed: Sep. 26, 1988

[30] Foreign Application Priority Data

Nov. 20, 1987 [DE] Fed. Rep. of Germany ....... 3739297

[51] Int. Cl.$^4$ ............................................. B01D 27/06
[52] U.S. Cl. ................... 210/485; 210/493.2; 210/493.5; 210/497.2; 55/492; 55/497; 55/498; 55/500; 55/510; 55/521; 55/DIG. 5; 264/DIG. 48; 493/941
[58] Field of Search ............... 264/DIG. 48; 493/379, 493/383, 390, 393, 941, 292, 297, 308; 210/435, 450, 484, 485, 493.1, 493.2, 493.5, 497.01, 497.2; 55/492, 497, 498, 500, 502, 510, 521, DIG. 5

[56] References Cited

U.S. PATENT DOCUMENTS

| | | | |
|---|---|---|---|
| 2,801,751 | 8/1957 | Thomas | 210/493.2 |
| 2,895,174 | 7/1959 | Hockett | 264/DIG. 48 |
| 2,988,227 | 6/1961 | Harms | 210/493.2 |
| 4,322,230 | 3/1982 | Schaen et al. | 55/498 |
| 4,512,892 | 4/1985 | Ganzi et al. | 264/DIG. 48 |

FOREIGN PATENT DOCUMENTS 2360156 12/1973 Fed. Rep. of Germany ... 210/493.2
2126080 8/1980 Fed. Rep. of Germany .

Primary Examiner—Richard V. Fisher
Assistant Examiner—Wanda L. Millard
Attorney, Agent, or Firm—Burns, Doane, Swecker & Mathis

[57] ABSTRACT

A tubular filter element for liquid filters comprises a perforated support pipe. Disposed around the inside of the support pipe is a tubular filter layer which comprises a folded sheet of filter material. Within each end of the filter element a spring washer is disposed for biasing the end of the tubular filter layer outwardly against the inside of the support pipe. In this pre-biased state, the ends of the filter element are joined to disks by means of a hardenable casting material.

9 Claims, 2 Drawing Sheets

TUBULAR FILTER ELEMENT WITH BIASING ELEMENT AND METHOD OF MAKING

BACKGROUND OF THE INVENTION

The invention concerns a tubular filter element or cartridge for liquid filter devices. Such a filter element typically comprises a perforated support pipe. A filter layer comprising a folded sheet of filter material is applied against an inside periphery of the pipe. A pair of disks are located on both ends of the filter element, the disks being joined to the support pipe and the filter layer by a hardened cast-in material.

During use of the filter, the liquid to be filtered flows through the tubular filter element from the inside out, i.e., a pressure builds up inside the filter element that is higher than the pressure on the outside of the filter element. The differential pressure established in this manner on the filter element rises with an increasing degree of clogging of the filter. Although in the actual operation of conventional filter elements, pressure differences on the order of only 1.1 bar (15 psi) occur, during testing of the filter element, very high pressure differences of up to 5.2 bar (75 psi) are specified, whereby the filter elements are highly stressed.

Particularly high requirements are set for certain liquid filter elements which are utilized in high pressure environments. In the case of a known filter element (see German Publication DE-21 26 080) several layers of fiber material are applied to the outside of a perforated support pipe, in particular for coalescence. A sheet of filter material, folded and arranged in a tubular shape, is applied to the inside of the pipe. The perforated support pipe and all of the filter and separating layers of these known filter elements are adhesively bonded at their ends to annular disks, provided with internal and external beaded rims. Usually, the ends of the filter material are cast within the disks by means of a hardenable molding material, in particular, a plastic resin which hardens after being poured into the disk, thereby establishing an intimate connection or adhesive bond of the disk with the ends of the filter element.

Due to the pressure difference existing between the inner and outer sides of the filter element, the tubular folded filter layer is deformed into contact with the inside of the perforated support pipe and is thus supported by the pipe, so that even relatively high difference pressures cannot damage or destroy the filter layer. However, such a radial support of the filter layer against the support pipe occurs only if the filter layer is able to bear firmly against the support pipe under the effect of the pressure differential. But movement or deformation of the filter layer into contact with the pipe cannot occur at the ends of the filter layer, since those ends are resin-cast or otherwise fixedly joined to the disks.

Since the ends of the folded filter layer are unable to bear against the support pipe in such a manner as to be suitably supported for resisting the effect of the internal pressure, the folded filter layer becomes stressed in shear at its ends. This stress, which could lead rapidly to the damaging or destruction of the folded filter layer, is particularly high if, during the resin-casting operation, a gap is created between the outer circumference of the folded filter layer and the inside of the support pipe.

It is, therefore, an object of the invention to provide a filter element of the afore-mentioned type in filter layer at the resin-cast ends may be prevented safely with simple structural means.

SUMMARY OF THE INVENTION

This object is attained according to the invention by a filter element and method of making same in which spring washers are disposed in the ends of the folded filter element for biasing those ends outwardly toward the pipe. The spring washers, which are inserted prior to the casting of the folded filter and pipe to the end disks, press the filter layer uniformly radially against the support pipe from the outside, so that the filter layer is immobilized by the subsequent casting in a position in which it bears firmly against the pipe. Accordingly, the internal pressure generated during operation cannot cause an appreciable stressing in shear of the filter material. The formation of any gap between the outside of the filter layer and the inside of the support pipe is, of course, also prevented.

As the spring washer is small and inexpensive and requires little space, the spring washer is left in the filter element after installation and casting. The two spring washers provide additional protection for the sensitive terminal areas of the filter element. The spring washers result in the reduced deposition of dirt at the ends of the filter layer, and the liquid flow is kept away from said terminal areas.

According to a preferred embodiment of the invention, the spring washer comprises a spring elastic metal strip, the ends of which overlap in the inserted state. In this embodiment, the spring strip may be produced very simply and leads to an extensively uniform radial spreading effect, resulting in a uniform radial contact pressure for the filter layers against the support pipe.

Preferably, the spring washer comprises a strip of spring steel, which in the unstressed state comprises an essentially straight center section and precurved terminal sections on both ends. The strip of spring steel preformed in this manner may be installed easily during the mounting of the filter element, without the danger of the ends of the strip being pressed extensively into the filter layer.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which.

DETAILED DESCRIPTION OF A PREFERRED EMBODIMENT OF THE INVENTION

Figure 1:
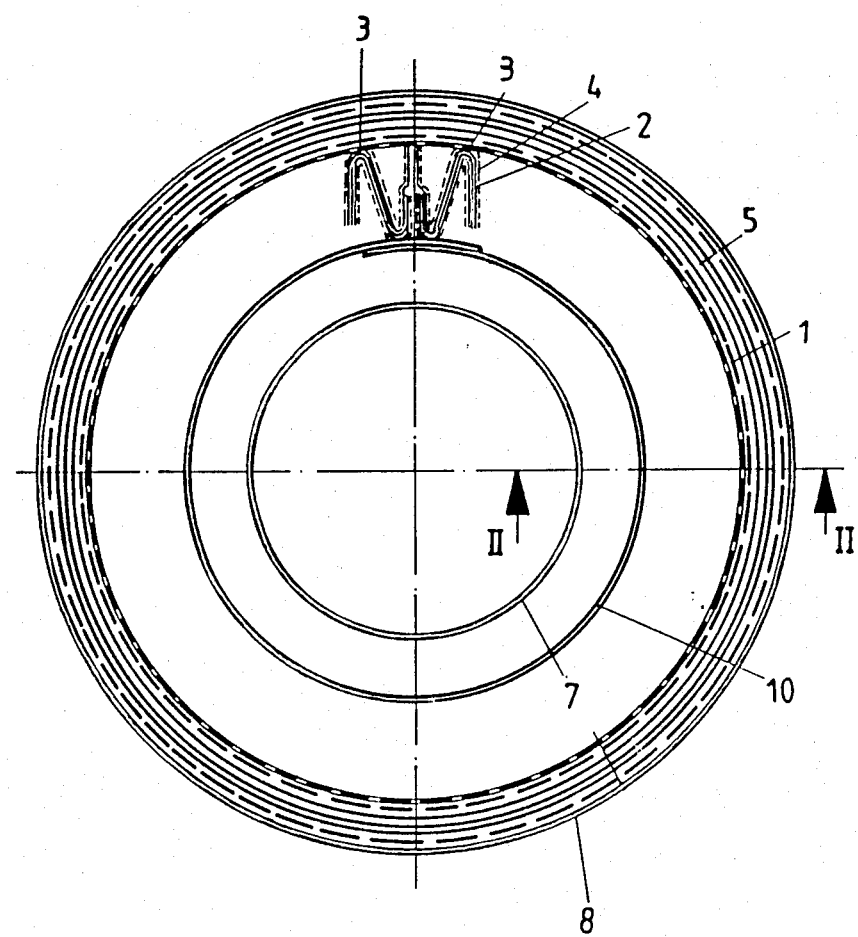
FIG. 1 is a cross-sectional view through a filter element according to the present invention.
Figure 2:
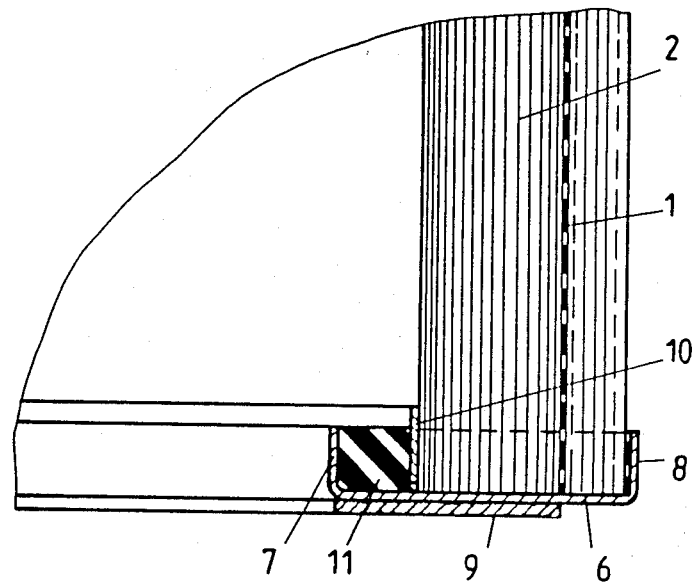
FIG. 2 is an enlarged partial longitudinal section taken along the line II—II in FIG. 1.

A tubular or cartridge-type filter element shown in section in FIGS. 1 and 2 forms a separator element for a liquid filter device. The liquid, e.g., water, to be filtered flows through the filter element from the inside out. The filter element comprises a perforated sheet metal support pipe 1, to the inside of which a folded filter layer is applied. The folded filter layer comprises a sheet 4 of filter material folded into a tubular-shape to form a plurality of radially inner and outer alternating folds 3. The sheet may comprise one or several layers.

For the sake of clarity, in FIG. 1 only a few folds 3 of the filter layers 2 are shown which are distributed uniformly over the entire circumference.

At both ends of the filter element essentially annular metal supporting disks 6 are located. The disks have cylindrical beaded rims 7 and 8 at their inner and outer radial edges, which rims form recesses for receiving longitudinal ends of the pipe 1 and filters 2, 5. On the outside of each disk 6 a flexible gasket 9 may be provided.

During assembly of the filter element, but prior to the application of the disks 6, spring washers 10 are inserted into the ends of the folded filter layer 2 so as to engage the inner side of that layer 2. The spring washers presses the ends of the filter layer 2 radially outwardly against the support pipe 1.

In this state, i.e., with the spring washers 10 inserted, one end of the support pipe 1, together with the folded filter layer 2 and the wound part 5, is set into a disk 6 and cast-in place by means of a hardenable molding material 11, for example, a hardenable synthetic resin in the usual manner. The other end of the filter element is fixedly joined in a similar manner to the other disk 6.

Since the elastically spring washer 10 presses the folded filter layer 2 outwardly against the inner side of the support pipe 1 until the molding material 11 is hardened, the ends of the folded filter layer 2 bear firmly against the support pipe 1 and are cast-in place in this position.

Thus, at the time when the folded filter layer becomes bonded to the disk by the material 11, the condition of the filter layer is such that it is pressed against the pipe 1 in a manner precluding the presence of a gap between the folded filter layer and the pipe, and simulating the action of the differential pressures created during a filtering operation. The ends of the folded filter element thus become adhered to the disks in such a pre-pressed state, whereby there can occur no excessive stressing or shearing of the ends of the folded filter layer by the outward forces imposed during a filtering operation.

Thus if, during the operation of the filter element, for example upon the application of higher test pressures, the differential pressure presses the folded filter layer 2 outwardly until it abuts the support pipe 1, there is no danger that the filter layer will be exposed to an unacceptable shear stress at the clamping location in the casting material 11. Damage or destruction of the filter layer 2 is thus prevented.

Figure 3:
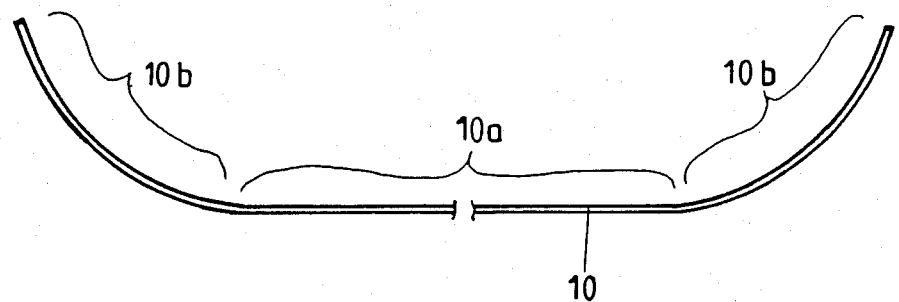
FIG. 3 is an edge view of a spring washer in the unstressed state.

The spring washer 10 comprises a strip of spring steel and is shown in a relaxed state in FIG. 3. The washer comprises an essentially straight or slightly curved center section 10a, which is followed on both sides by precurved terminal sections 10b. The ends of the spring steel strip may be rounded. The strip of spring steel preformed in this manner is inserted, during assembly of the filter, into an end of the tubular filter layer 2 such that the ends of the strip overlap circumferentially as shown in FIG. 1. The spring washer 10 thus assists in the assembly steps and remains in the filter element after the assembly and the hardening of the casting material 11.

As shown in FIG. 2, the spring washer 10 protrudes axially inwardly beyond the inner beaded rim 7, thereby providing additional protection for the end of the folded filter layer 2. The incoming liquid flow is kept from directly reaching the end of the folded filter layer, whereby no deposition or very little deposition of dirt may take place.

The spring washer 10 may alternatively be made of plastic or other materials. It may also have an endless or circumferentially closed configuration, if by means of axial notches or the like, adequate elastic properties in the radial direction are created.

Although the present invention has been described in connection with a preferred embodiment of the invention, it will be appreciated by those skilled in the art that modifications, substitutions, deletions and additions may be made without departing from the spirit and scope of the invention as defined in the appended claims.

What is claimed is:

1. A tubular filter element comprising:
   a perforated cylindrical support pipe including inner and outer peripheries,
   a tubular folded filter layer disposed around said inner periphery,
   a pair of disks defining recesses within which are disposed longitudinal ends of said pipe and said filter layer, said ends being secured to said disks by a hardened cast-in material disposed in each said recess, and
   spring means disposed within respective longitudinal ends of said folded filter layer, each said spring means disposed in a each said recess and extending around an inner periphery of said folded filter layer for elastically pre-biasing said ends of said folded filter layer outwardly against said pipe.

2. A filter element according to claim 1, wherein said spring means comprises a pair of spring washers.

3. A filter element according to claim 2, wherein each said spring washer is connected to its associated disk by said cast-in material.

4. A filter element according to claim 2, wherein each said spring washer comprises an annular metal strip having circumferentially overlapping ends.

5. A filter element according to claim 4, wherein said strip is formed of a strip of spring steel which in a relaxed state comprises a substantially straight center section terminating in precurved end sections.

6. A filter element according to claim 2, wherein each said spring washer comprises a plastic material.

7. A filter element according to claim 2, wherein each said disk comprises inner and outer rims defining each said recess, each said spring washer spaced to the outside of its associated inner rim.

8. A filter element according to claim 7, wherein each said spring washer extends longitudinally inwardly beyond its associated inner rim.

9. A method of making a tubular filter element, comprising the steps of:
   providing a perforated cylindrical support pipe including inner and outer peripheries,
   positioning a tubular folded filter layer having ends around said inner periphery,
   inserting onto said ends of said folded filter layer and said pipe, a pair of disks defining recesses which receive said ends, and
   pouring a hardenable material into said recesses and causing said material to harden while biasing said ends of said folded filter layer against said inner periphery of said pipe by a pair of spring washers inserted into respective ends of said folded filter layer prior to said inserting step, such that said spring washers extend around an inner periphery of said folded filter layer and elastically bias said ends of said folded filter layer outwardly against said inner periphery of said pipe.

* * * * *